United States Patent Office 3,309,211
Patented Mar. 14, 1967

3,309,211
METHOD OF TREATING CLAY AND CLAY
PRODUCED THEREBY
Armin Weiss and Werner Thielepape, Heidelberg, Germany, assignors to Erbsloh & Co. Geisenheimer Kaolinwerke, Geisenheim (Rhine), Germany
No Drawing. Filed Mar. 4, 1964, Ser. No. 349,451
Claims priority, application Germany, Mar. 5, 1963,
E 24,433
16 Claims. (Cl. 106—72)

This invention generally relates to clay and is particularly directed to a process of improving the properties and characteristics of clay by distending the crystal lattice or skeleton (hereinafter referred to as "lattice") thereof, and to the clay obtained by such process.

The term "clay" as used in this application including the appended claims is deemed to refer to any kind of clay, such as kaolin, which comprises a proportion of kaolinite.

It has previously been suggested to improve and enhance the plastic properties of clay by subjecting the clay to various mechanical treatments. It is thus known by those skilled in the art of clay processing that the plasticity of clay may be slightly improved by grinding the clay in a suitable grinding apparatus, preferably in the presence of water, i.e. to subject the clay to so-called "wet grinding." The removal of microorganisms from the clay may also in some instances improve the plastic properties. Although these prior art procedures may thus slightly benefit the plasticity of clay, they have, however, no significant influence on the thixotropic properties and the adsorption capacity of the clay. Nor do these treatments affect the wettability or resistance to breakage of the clay in dry form.

Accordingly, it is a primary object of this invention to provide for a novel process for significantly enhancing the plastic and thixotropic characteristics of clay and to improve the adsorption capacity of such clay.

Another object of this invention is to provide for a process for influencing the wettability and breakage resistance of clay in dry form to a desired extent. Still another object of this invention is to provide a process for the purposes referred to, which is simple to carry out without requiring substantial plant investment.

It is also an object of this invention to provide clay of improved qualities.

Generally, it is an object of this invention to improve of the art of clay processing as presently practiced.

Briefly, and in accordance with this invention it has been ascertained that the above-mentioned objects are obtained by distending the crystal lattice of the kaolinite, which is accomplished by reacting the clay with certain chemical compounds to produce kaolinite-intercalation products. Due to the reaction referred to, extraneous molecules enter between the individual kaolinite layers by way of diffusion, to distend the lattice structure of the kaolinite or clay.

According to a further feature of the invention, it has been established that particularly superior results are obtained if the clay, either during the reaction with the intercalation-product-forming compound and/or subsequent thereto, is subjected to a mechanical treatment which causes a relative movement between the individual kaolinite layers, so that these layers glide or slide relative to each other.

A large number of chemical compounds have been found to be suitable for the formation of the kaolinite-intercalation compounds referred to for the purpose of distending the lattice of the clay. Such suitable chemical compounds may conveniently be classified and grouped as follows:

(a) The ammonium-, potassium-, rubidium- and cesium salts of lower carboxylic acids as, for example, ammonium acetate, potassium acetate, rubidium acetate, cesium acetate, ammonium propionate, potassium propionate and potassium cyanoacetate;

(b) Acid amides of not more than four carbon atoms as, for example, urea, thiourea, formamide, acetamide, chloroacetamide, potassium amidophosphate, potassium amido-sulfonate and sulfoamide;

(c) Hydrazine;
(d) Hydroxylamine;
(e) Dimethylsulfoxide
(f) Chloralhydrate and
(g) Liquid ammonia or concentrated ammonia solutions at high ammonia pressure.

All these compounds and others embraced by the generic groups a through g referred to above, are capable of forming the kaolinite-intercalation products referred to with resulting distention of the kaolinite lattice work.

Those of the compounds of groups a through g which normally exist in liquid form, or which can be obtained in molten form without decomposition, may be reacted with the clay in such liquid or molten state. However, it is perfectly feasible within the scope of this invention to use such compounds in concentrated aqueous or alcoholic solutions.

Extensive experiments have established that the amount of intercalating compound of groups a–g to be reacted with the clay is to a certain extent determinative of the improvement to be obtained in the desired characteristics of the respective clay. It has thus been established that at least 4 grams of pure compound per 100 grams of clay have to be employed in order to obtain a significant distention and thus the desired improvement in the plastic, thixotropic and adsorptive properties of the clay. With a view to obtaining a maximum effect, larger amounts of intercalating compounds should be used. Thus, it is advantageous to employ more than 10 grams of pure compound per 100 grams of clay. In some instances, amounts in excess of 20 grams of compound per 100 grams of clay may accelerate the intercalation reaction. However, in such event, the quantities in excess of 20 grams per 100 grams of clay are usually not retained in the interior of the kaolinite crystal structure.

It should also be emphasized that it is within the scope of this invention ot use simultaneously two or more of the compounds of groups a–g.

Although, a relatively large number of intercalation-product-forming compounds have been enumerated, and are in fact suitable, it has been established that from a practical point of view particularly excellent results are obtained if compounds of groups a, b and c are employed for the formation of the intercalation product.

As previously set forth, the inventive process also requires that either during the treatment with the intercalation-forming-compound and/or subsequent thereto, the clay is subjected to a mechanical treatment which causes a sliding or gliding of the individual kaolinite layers relative to each other. A variety of different mechanical treatments are suitable for this purpose. However, it has been established that particularly favorable and beneficial results are obtained if the mechanical treatment results in the creation of shearing forces which act entirely or at least partially in a direction perpendicular to the normal of the respective layers. Such shearing forces, of course, result in the desired relative sliding of the kaolinite layers.

It will be realized that, due to the intercalation of the chemical substance, the binding or bonding forces between the individual layers of the clay are weakened so that the mechanical treatment to which the clay is subjected more easily causes the desired sliding action of the layers relative to each other. In this manner the properties of the clay as, for example, with regard to its plasticity are significantly improved.

As examples for such mechanical treatments the following may be mentioned:

(1) Extrusion of drawing through a nozzle;
(2) Rolling;
(3) Grinding as, for example, in ball mills, disc mills, roller carriage grinding mills and the like;
(4) Kneading, as for example, in suitable kneading machines, pan grinders or pug mills;
(5) Rubbing in suitable rubbing equipment, for example, between plane plates or between parallel surfaces in general.

The mechanical treatment may be carried out in equipment which causes not only the generation of the shearing forces referred to, but which also exerts additional mechanical action on the clay, as for example, in hammer mills, various kinds of beaters and ultrasonic devices. If the mechanical action results in high speed shearing forces, the individual layers will then be divided into thin crystal plates or lamella and, moreover, a reduction in the lamella diameter will be obtained. The mechanical treatment may be carried out without isolating the kaolinite-intercalation products formed.

The molecules which enter between the kaolinite layers during the production of the intercalation products by way of diffusion significantly reduce the interaction forces between the individual silicate layers. For this reason, the mechanical treatment results in a sliding of the individual kaolinite layers relative to each other, thus causing a breaking up into thin lamella or crystals. This in turn, of course, increases the specific surface of the crystals by a multiple and the thickness of the individual crystals is reduced to a fraction of their original thickness. Dependent on the particular mechanical treatment employed, the diameter of the crystals may, however, be largely maintained, if desired, or the diameter may be reduced. This means that all those characteristics which have relation to the size of the crystal surfaces or the bendability of the crystals can be significantly improved by the mechanical treatment.

In essence, therefore, the inventive process essentially comprises two factors, to wit: (1) the treatment of the clay with one or more of the compounds of groups a–g and (2) the mechanical treatment of the indicated nature, the amount of the compound or compounds of groups a–g being at least 4 grams per 100 grams of clay.

The invention is also concerned with a modification according to which the intercalation product is further treated with an additional substance or substances for at least partially displacing the compound or compounds which has or have previously been reacted with the clay during the initial intercalation reaction. In such event, the original compound, that is the compound of groups a–g may act as a carrier or reaction inducing compound which positively "pulls in" the additional substance into the lattice work. This modification is particularly advantageous in the event that a kaolinite-intercalation product is to be formed with a substance which originally is not capable of producing an intercalation product with kaolinite, but which is capable of entering the kaolinite lattice work due to the presence of a previously incorporated compound of groups a–g. This means that in accordance with the inventive modification, it is now possible to form intercalation products between clay and substances which normally cannot be introduced into the clay lattice work, but which are now able to thus enter the lattice work due to the presence of the previously incorporated compound. The replacement of the compound of groups a–g, which has been originally introduced into the lattice structure, by a new substance is therefore in effect a displacement reaction which changes the interaction forces between the individual kaolinite layers and which, moreover, may alter the packing density of the intercalated compounds. The displacement may be carried out in a single step with the original intercalation, by reacting the clay with a mixture of a compound of group a–g and such additional substance.

While, as previously set forth, a large number of substances cannot be reacted directly with untreated clay, the reaction of the intercalation product with many such additional substances is feasible so that the originally incorporated molecules can be replaced by molecules of different nature.

Such additional substances with which the displacement reaction is to be carried out are usually employed in pure form, if they are liquid or can be obtained in molten state without decomposition. Other such additional substances may be used in the form of concentrated solutions. However, it is also feasible to react the clay with the additional substances in solid form if the original intercalation product is employed in moist or wet condition. The moisture of the intercalation product acts then as a solvent for the new substance to be introduced.

In order to incorporate the additional substances into the clay in a single step with the intercalation of the chemical compound, the former may be dissolved in one of the compounds of groups a–g or a solution thereof.

Such additional substances to be incorporated into the clay may be grouped or classified as follows:

(1) Saturated aliphatic amines as, for example, propyl amine, butyl amine, pentyl amine, hexyl amine, heptyl amine, octyl amine, decyl amine, dodecyl amine and stearyl amine;

(2) Secondary and tertiary amines as, for example, diethyl amine and decylcetyl amine;

(3) Quaternary ammonium salts as, for example, trimethylcetyl ammonium salts and dimethyldistearyl ammonium salts, or N-alkylpyridinium salts;

(4) Diamines as, for example, ethylene diamine, trimethylene diamine, tetramethylene diamine, pentamethylene diamine and hexamethylene diamine;

(5) Polyimines as, for example, diethylene triamine, triethylene tetramine and polyethylene imine;

(6) Unsaturated amines, as for example, oleyl amine;

(7) Simple and substituted aromatic amines as, for example, aniline, bromo aniline, benzidine;

(8) Heterocyclic amines, as for example, pyridine, $\alpha$-aminopyridine, 3-picoline, 4-picoline, collidine, quinoline and lutidine;

(9) N-substituted acid amines, for example, dimethyl formamide and N-methyl acetamide;

(10) Fatty acid amides having between 4 to 22 carbon atoms, as for example, propionic amide and stearic acid amide;

(1) Metal salts of carboxylic acids (carbon-substituted acetates) as for example, the sodium-, potassium-, lithium-, ammonium-, magnesium-, strontium-, barium-, aluminum-, chromium-, iron-, cobalt- and nickel salts of acetic acid, propionic acid, glycokoll, alanine, lysine, maleic acid and lactic acid;

(12) Lactames and lactones as, for example, $\epsilon$-caprolactame;

(13) Ammonium fluoride;

(14) Alkalimetal- and ammonium halides, as for example, lithium-, sodium-, potassium-, rubium-, cesium-, and ammonium fluoride, -chloride, -bromide, and iodide;

(15) The alkaline earth metal halides;

(16) The alkali metal nitrates and the alkaline earth metal nitrates;

(17) Pseudohalides, as for example, cyanides and rhodanides of lithium, sodium, potassium and ammonium;

(18) Aluminum-halides;

(19) The chlorides, bromides, iodides, nitrates, and acetates of chromium, iron, cobalt, nickel, manganese and copper;

(20) The salts of hydroxylamine and hydrazine.

It will be realized that groups 1–8 could be generically classified as saturated, unsaturated and aromatic amines and ammonium compounds.

In carrying out the displacement reaction, the previously formed kaolinite intercalation compound is treated with the new substance or a concentrate solution thereof, thereby to introduce this new substance into the clay or kaolinite lattice and to displace the previously incorporated compound or compounds of groups a–g. The speed of the displacement reaction increases with higher temperatures. The displacement reaction proceeds particularly rapidly at temperatures at which the compound to be displaced is already in volatile state.

All the compounds embraced by groups 1–20 can thus be introduced into the kaolinite lattice. The extent of the displacement is dependent on the particular circumstances and may either be complete so that the entire amount of the previously introduced compound is displaced or a partial displacement may take place.

A particular embodiment of the inventive displacement reaction resides in the displacement of weakly basic originally intercalated compounds by somewhat stronger basic substances.

According to the same principle, a partial displacement of the original intercalating compound can be effected thereby that the cations of intercalated salts are displaced by the cations of a stronger base. Thus, for example, the ammonium ions of intercalated ammonium acetate may be replaced by lithium-, sodium-, manganese-, potassium-, strontium- or barium ions. A similar partial displacement may be performed in the reverse with the anions of the intercalated salts. In all those instances in which a partial displacement reaction is intended, it is advantageous if the base or acid to be displaced is readily volatile.

The inventive process is also concerned with a further modification, wherein the intercalated compound and/or substance are again removed, either completely or partially, from the lattice structure of the clay. This modification applies both to the embodiment wherein the clay is treated with one or several of the compounds of group a–g only and the embodiment wherein the intercalated compound thus obtained is thereafter subjected to a displacement reaction with one or several of the substances of group 1–20. The removal of the intercalated compounds or substances from the lattice structure of the clay may be accomplished in different ways. Thus, for example, the intercalation product, dependent on the circumstances and the desired results, may be subjected to one or several of the following treatment steps:

(A) Dilution with water or other liquids having a dissolving action on the compound or substance within the clay structure;

(B) Washing with liquids of the nature described under (A) above;

(C) Evaporation;

(D) Vacuum treatment;

(E) Drying at room temperature or elevated temperature;

(F) Allowing the intercalated product to remain on the open air;

(G) Treating the intercalated product according to any one of the procedures mentioned in groups A–F above under simultaneous presence of adsorption or absorption agents for the respective compound or substance.

If the intercalated product is thus treated in any of the manners described hereinabove, the previously incorporated molecules are effectively removed again and pure clay remains, which, however, has been permanently improved with regard to its plastic, thixotropic and adsorptive properties. Moreover, the wettability and resistance to breakage will have been favorably affected.

As previously mentioned, the inventive process is applicable to all kaolinite-comprising clays such as kaolin. The inventive treatment significantly improves the properties of such clays, particularly with regard to plasticity, thixotropic characteristics and adsorption capacity. However, it has also been established that the inventive procedure increases the resistance to breakage of the clay in dry state and affects the wettability of the clay. The improvement in these characteristics of the clay is the larger, the greater the proportion by weight of kaolinite in the clay. It has been ascertained that the best results are obtained with clay which essentially consists of kaoline having large crystals and having originally an insignificant plasticity. The smallest improvement is obtained in the treatment of kaoline of the so-called fire clay type.

The reactivity of different clays varies to a very significant extent. The action times and action temperatures referred to in the following examples therefore may be considerably shorter or longer, and higher and lower, respectively, dependent on the particular nature of the clay employed. Under favorable circumstances, 20% of the time periods mentioned in the examples may sometimes be sufficient in order to obtain technically valuable improvements in the clay characteristics. By contrast, with regard to other types of clay which may be subjected to the inventive treatment, action periods of greater duration may have to be used and thus the time periods mentioned in the examples may sometimes have to be multiplied by the factor 5 to 20. Again the reaction temperatures may in many instances have to be increased.

It has been established that in many instances it may be advantageous to use clay which has been treated in accordance with the invention in conjunction with untreated clay or kaolin. In other words, a minor proportion of treated clay may be mixed with a proportion of untreated clay and the mixture thus obtained may then be put to the respective use. This mixing may optionally be effected prior, during or subsequent to the mechanical treatment of the materials.

The invention will now be described by several examples, it being understood, however, that these examples are given by way of illustration and not by way of limitation and that many changes may be effected in process conditions in general and choice of raw materials etc. without affecting in any way the scope and spirit of this invention as recited in the appended claims.

*Example 1.—Preparation of ammonium acetate-kaolinite*

20 grams of an aqueous solution of ammonium acetate were mixed with 100 grams of kaolin. The solution was saturated at cold temperature. The pH value of the ammonium acetate solution was between 7 and 10, and had been adjusted with a base or ammonia. The mixture of the kaolin with the ammonium acetate solution resulted in a dough-like mass or slurry. This mass or slurry was stored for at least 3 hours at a temperature below 65° C. Ammonium acetate-kaolinite had been formed during this period.

The ammonium acetate-kaolinite was subjected during this storage period to a mechanical treatment which in the present example consisted of kneading the mass in suitable kneading equipment.

The maximum reaction speed took place at pH values between 8 and 9 and at temperatures between 20–45° C.

The experiment was repeated in the same manner but the mechanical treatment was effected after the storage period referred to. Moreover, the mechanical treatment in the repetition experiment consisted in extruding the mass through a nozzle.

Tests established that the clay or kaolin thus obtained had significantly improved plasticity and thixotropic properties as compared to untreated kaolin of the same nature. Moreover, the wettability of the kaolin and its resistance to breakage were considerably improved.

Moreover, it was established that the inventive improvement of the kaolin also could be obtained by employing larger amounts of ammonium acetate. Further, with quantities of ammonium acetate as low as 5 grams and above, considerable improvement could be observed. The experiments were thereafter repeated by replacing the ammonium acetate with the same amounts of potassium acetate, rubidium acetate and cesium acetate, respectively. Moreover, a further series of experiments was performed with potassium propionate, rubidium propionate and cesium propionate, respectively. The experiments with the latter compounds established that the treatment could be effected at temperatures up to 120° C. The reaction speed increases with such higher temperatures.

*Example 2.—Preparation of formamide-kaolinite*

100 grams of kaolin were stirred with 12 grams of anhydrous formamide and the mixture thus obtained was stored at a temperature of about 80° C. for about 10 hours. Formamide-kaolinite had been formed during this period. This could be recognized by the enlarged distance between the kaolinite layers. The increase in the distance was observed by radiographic methods. A partial conversion of the kaolin into a desired intercalation product, sufficient for resulting in a significant improvement of the kaolin upon mechanical processing, was obtained with considerably smaller amounts of formamide, as, for example, 3 to 4 grams or more. Further, excellent results were obtained with shorter action periods. Excess of formamide has no negative influence on the result. The reaction temperature may be varied between 0 and 120° C. The formamide may also be diluted with solvents, as, for example, alcohol.

The experiment was repeated by replacing formamide by acetamide and similar results were obtained.

The mechanical treatment to which the intercalation product was subjected either during or after the formation thereof, was in the present instance a grinding treatment in a ball mill.

*Example 3.—Preparation of hydrazine-kaolinite*

100 grams of kaolin were stirred with an aqueous solution of 8 grams of hydrazine. The amount of water in the solution was calculated so that the hydrazine solution was at least 3 molar. The mixture thus obtained was thereafter maintained in a temperature range between 0 and 110° C. for about 2 hours. It was established that with lower hydrazine concentrations, the reaction speed is larger in the cold than at elevated temperatures. If the hydrazine concentration is very high, the reaction speed is, however, greater at elevated temperatures. At constant temperature, the reaction speed reaches a maximum in the mean concentration range as indicated. This means that the required reaction periods are strongly dependent on the particular conditions prevailing. A very significant improvement in the kaolin properties can be observed even if very short action periods are chosen. Thus, even if the hydrazine solution acts on the kaolin for a few minutes only, the clay is imparted with considerably improved characteristics provided the material is subjected to one of the mechanical treatments referred to.

The hydrazine may also be used in anhydrous form or as a solution in a non-aqueous solvent.

*Example 4.—Preparation of hydrazine-kaolinite*

100 grams of kaolin were stirred with an aqueous solution of 8 grams of hydrazine. The amount of water was such that the hydrazine solution was 5 to 20 molar. The mixture was maintained in a temperature range of between 0 and 80° for about 2 hours. The clay was thereafter rolled in a rolling mill. Excellent results were obtained.

*Example 5.—Preparation of urea-kaolinite*

100 grams of kaolin were mixed with 5 to 35 grams of an aqueous, saturated solution of urea, so as to obtain a dough-like mass or slurry. The water may be replaced by a different solvent. The mixture or slurry thus obtained was maintained for at least 12 hours at a temperature between 60–120° C. It was established that at a temperature of between 0 and 60° C., the mass should be stored for at least 2 days. After this period, a major portion of the kaolin had been converted into an urea-kaolinite intercalation product.

*Example 6*

A dough-like mass was prepared from 100 grams of kaolin and 35 grams of a saturated solution of urea. The mixture thus obtained was treated for twenty-four hours in a closed container or vessel at a temperature of 110° C. The kaolinite had been transformed after this period into an urea-kaolinite intercalation product. The product was thereafter subjected to a suitable mechanical treatment of the nature previously indicated.

*Example 7.—Preparation of dimethylsulfoxide-kaolinite*

A dough-like mass was prepared by mixing 100 grams of kaolin with at least 5 grams of dimethylsulfoxide. The mixture was stored for several days and thereafter subjected to rolling.

The following examples illustrate the performance of displacement reactions. For this purpose the original intercalation product, such as, for example, described in any one of the preceding examples, i.e., ammonium acetate-kaolinite, formamide-kaolinite, hydrazine-kaolinite, urea-kaolinite or dimethylsulfoxide-kaolinite was first produced. The new substance to be incorporated into the kaolinite lattice structure was employed in pure state or in the form of a concentrated solution and the kaolinite intercalation product was then subjected to the action of this new substance. In this manner, the previously incorporated or intercalated molecules were at least partially displaced and replaced by the molecules of the new substance.

*Example 8*

100 grams of ammonium acetate-kaolinite which had been prepared according to Example 1, were mixed with 3 grams of a saturated aliphatic amine and the mixture was allowed to stand for at least 2 hours. The amount of the saturated aliphatic amine can be raised to a higher value. The saturated aliphatic amine may be used in the form of a saturated solution of the amine in alcohol or in a different solvent or a saturated solution of the ammonium salt may be employed. The reaction speed may be accelerated by employing elevated temperatures. The distance between the individual layers of the kaolinite increases as a result of the treatment. The increase in the distance between the layers with the employment of different amines is as follows:

With:
| | | |
|---|---|---|
| Hexylamine to | 26.7 A. | (—ca. 30 A.) |
| Octylamine to | 31.7 A. | (—ca. 35 A.) |
| Decylamine to | 37.0 A. | (—ca. 42 A.) |
| Dodecylamine to | 42.1 A. | (—ca. 47 A.) |
| Dodecyl ammonium chloride to | 42.4 A. | (—ca. 47 A.) |
| Stearylamine to about | 51.0 A. | (36–58 A.) |

*Example 9*

100 grams of ammonium acetate-kaolinite which had been produced according to Example 1, were treated with at least 3 grams of a secondary or tertiary amine. The amine was employed in pure or dissolved from and the mixture obtained was allowed to stand for at least two hours. An increase in the temperature accelerated the reaction speed. The treatment resulted in an increase in the basal plane spacing of the ammonium acetate-kaolin of between 14 to 17 A. The increase in the distance was 10.1 A. with diethylamine and about 48 A. with decylcetylamine.

Example 10

100 grams of ammonium acetate-kaolin were admixed with at least 8 grams of pentamethylenediamine and the mixture was stored for at least two hours. After this period, liberated ammonium acetate was expelled by heating. Chemical analysis yielded carbon values of 3.4% and nitrogen values of 1.6% for the pentamethylene diamine kaolinite thus produced.

Example 11

100 grams of hydrazine-kaolinite were admixed with at least 3 grams of pyridine and the mixture thus obtained was stored for at least one hour at low temperatures not exceeding 40° C. It is permissible to increase the temperature after this storage period. The treatment results in the displacement of a portion of the hydrazine by the aromatic base. A quantitative replacement of the hydrazine in the kaolinite lattice by the pyridine is accomplished, if larger amounts of the base are used.

The experiment was thereafter repeated with similar amounts of picoline and quinoline, respectively, and similar results were observed.

Example 12

100 grams of formamide-kaolinite which had been produced in accordance with Example 2, was slowly heated with 15 grams of dimethyl formamide to temperatures up to 120° C. This treatment resulted in a displacement of the formamide from the kaolinite lattice by dimethyl formamide, while the lattice structure at the same time was distended to about 12.0 A. Larger amounts of dimethyl formamide increases the speed of the displacement reaction even at lower temperatures.

The following examples illustrate the embodiment of the inventive process wherein on intercalation product is formed with a substance which normally does not react with the clay, but which is incorporated into the crystal lattice of the clay through the intermediary of a chemical compound which is capable of reacting with the clay and which thereby acts to positively pull in the substance which normally does not react with the clay.

Generally, a saturated solution of the substance to be intercalated was admixed with 0.1 to 100 grams per 100 grams of solution on one of the compounds of groups a–g, particularly hydrazine, formamide, urea, ammonium, acetate, potassium acetate or mixtures thereof and the kaolinite was then treated with this mixture. Particularly suitable is the use of hydrazine as intercalation inducing compound because when the final product is left on the open air, the hydrazine readily evaporates or may be distilled off without great difficulties.

Example 13.—Preparation of amino acid-kaolinites

A saturated solution of at least 5 grams of lithium glycocollate was admixed with 1 gram of hydrazine hydrate. The liquid mixture is then added to 100 grams of kaolin and the product thus obtained was stored for at least two days.

The same experiment was repeated with solutions of the following compounds to which 1 gram of hydrazine hydrate was thereafter added:

Sodium glycocollate, magnesium glycocollate, aluminum glycocollate, chromium glycocollate, iron glycocollate, cobalt glycocollate, and nickel glycocollate; sodium alaninate, magnesium alaninate, aluminum alaninate, chromium alaninate, iron alaninate, cobalt alaninate and nickel alaninate.

Sodium lysinate, magnesium lysinate, aluminum lysinate, chromium lysinate, iron lysinate, cobalt lysinate and nickel lysinate.

Example 14.—Formation of dimethyl formamide-kaolinite 100 grams of kaolin were mixed under stirring with 15 grams of dimethyl formamide and the mixture was admixed thereafter with one gram of hydrazine hydrate. In a second experiment, the hydrazine hydrate was replaced by formamide. A measurable intercalation reaction sets in after two to three hours. In order to achieve a quantitative reaction, the mass must be allowed to stand for up to twenty days dependent on the temperature employed.

Example 15.—Preparation of a clay of superior resistance to breakage in dry condition and having insignificantly changed thixotropic properties, by grinding in a mill with high shearing speed A dough-like mass was prepared from 100–1000 grams of kaolinite and a saturated solution of 200 grams of ammonium acetate in water at a pH value of 8. After three days, the basal plane spacing of the kaolin had increased from 7 to 14 A. The ammonium acetate-kaolinite thus formed, was then admixed with a saturated aqueous solution of 50 grams of sodium chloride. After a storage period of 2 days, the mass thus obtained was subjected to grinding in a grinding apparatus exerting high shearing speed. The ammonium acetate was recovered from the ground material by heating to 105° C. and the sodium chloride was removed by washing.

The improved kaolin had a very low thixotropy (8 ml. $H_2O$/3 grams kaolin), but had a very significant resistance to breakage in dry condition (35 kp./cm.$^2$). By contrast, the untreated starting kaolin had a thixotropy of 6 ml. $H_2O$/3 grams kaolin and a resistance to dry breakage of 2.8 kp./cm.$^2$. A control sample which was ground in the same manner but which prior and during the grinding had not been treated with ammonium acetate exhibited a thixotropic value of 10 ml. $H_2O$/3 grams kaolin and a resistance to dry breakage of 4.2 kp./cm.$^2$. A further sample which had been converted into ammonium acetate-kaolin, but which had not been admixed with a saturated sodium chloride solution, exhibited after the same grinding treatment a thixotropy of 14 ml. $H_2O$/3 grams kaolin and a resistance to breakage in dry condition of 48 kp./cm.$^2$.

The resistance to breakage is still further improved if the sodium chloride is replaced by potassium chloride.

Similar results are obtained if the ammonium acetate is replaced by any of the compounds of groups a–g, previously referred to.

Example 16.—Preparation of a hydrophobic kaolinite 100 grams of kaolin KJS were moistened in a uniform manner with 14 grams of formamide and the mixture was then stored at a temperature of 90° C. for 24 hours. The material thus obtained was subsequently admixed with a concentrated solution of 10 grams of polyacrylicnitrile in dimethyl formamide and was left to stand at room temperature for 24 hours. Similar experiments were carried out in which the polyacrylicnitrile was replaced by polyacrylic acid and polyacrylic acid methylester, respectively. The solvents were subsequently removed by distillation in vacuum or at atmospheric pressure at a temperature of 195° C. The remaining kaolin was organophilic and collected upon distribution between water and toluene quantitatively in the organic phase. The toluene may be replaced by xylene, benzene or decane containing slight amounts of benzene. If the product is ground prior to the separation of the solvent, a particularly finally divided organophilic kaolin is obtained.

The bulk weight of the untreated kaolin is 3.7 ml./g.;

The bulk weight of treated, but unground kaolin is 6.3 ml./g.;

The bulk weight of treated kaolin which during the processing was ground in formamide was 10.4 ml./g.;

The bulk weight of the kaolin which was ground after the formamide treatment was 12.8 ml./g.;

While the bulk weight of the kaolin which had been ground during the treatment with the polyacrylicnitrile solution was 8.9 ml./g.

The following examples illustrate the removal of the intercalating product from the clay.

*Example 17*

100 grams of ground ammonium acetate-kaolin were rubbed in suitable rubbing equipment with 20 grams of water. After 10 minutes of rubbing, an X-ray picture exhibited only the interferences of pure kaolinite. The interferences of ammonium acetate-kaolinite had completely disappeared.

*Example 18*

100 grams of ammonium acetate-kaolinite were ground at temperatures of between 25 to 70° C. in a rubbing machine used for analytical purposes. The temperature was slowly raised during the rubbing procedure within a period of about 2 hours. The ammonium acetate-kaolinite was in this manner reconverted into pure kaolin.

*Example 19*

100 grams of ammonium acetate-kaolin are heated after grinding, in a closed apparatus for 2 hours at 110° C. In doing so, the intercalated ammonium acetate escaped. The ammonium acetate can be recovered. Pure kaolin remains as residue. This kaolin has considerably improved characteristics.

THIXOTROPIC PROPERTIES

As evidenced in the following Table 1, the thixotropic limit or boundary volume is increased due to the inventive treatment by the factor 2–15. For comparison and control purposes, the table also indicates the thixotropic limit volumes of highly plastic kaolins and activated montmorillonite.

TABLE 1.—CHANGE OF THE THIXOTROPIC PROPERTIES OF KAOLINITE UPON WET GRINDING AS $NH_4OOC.CH_3$-KAOLINITE

| Sample | Thixotropic limit volume at a solidification time of 6 seconds ml. $H_2O$/3 g.-kaolinite | |
|---|---|---|
| | $NH_4^+$-kaolinite | $Ca^{2+}$-kaolinite |
| Starting kaolinite: | | |
| Schnaittenbach OF | 2.1 | 4.3 |
| Same, 6 days wet grinding | 3.1 | 5.8 |
| Same but as $NH_4OOC-CH_3$-kaolinite: | | |
| 1 day for grinding | 10.6 | 8.6 |
| 6 days of grinding | 10.6 | 8.6 |
| 8 days of grinding | 10.6 | 8.6 |
| Same but as $NH_4OOC-CH_3$-kaolinite rubbed in rubbing dish: | | |
| 30 minutes | 11.0 | 10.3 |
| 2 hours | 24.0 | 22.7 |
| Colloidkaolin from Chodau | 4.0 | 7.1 |
| Kaolin from Zettlitz | 3.8 | 9.0 |
| Montmorillonite from Geisenheim | $Na^+$:34 | 10.2 |

In order to measure the thixotropic limit or boundary volume, 3 grams of clay were filled for each test into glass test tubes having a clear width of 16 mm. The clay was admixed with water and was continuously shaken. The amount of water was such that the sample after 6 seconds of shaking and upon reversal of the tube was no longer liquid.

*Example 20.—Influence on the resistance to breakage in dry condition*

The resistance to breakage in dry condition of the clay can be increased by the inventive process to 30 to 50 times the resistance value of the untreated clay. With clays having low plasticity, values may be obtained in this manner which approach those of bentonite.

TABLE 2.—CHANGE IN THE RESISTANCE OF KAOLIN TO BREAKAGE IN DRY CONDITION

| Pretreatment of the kaolin: | Resistance to dry breakage kp./cm.$^2$ |
|---|---|
| Starting material from Schnaittenbach OF | About 1.0 |
| Same kaolin but rubbed for 30 minutes as ammonium acetate-kaolin and then washed | About 6.0 |
| Same kaolin but rubbed for 30 minutes as formamide-kaoline and then washed | About 5.0 |
| Same kaolin but rubbed for 30 minutes as hydrazine-kaolin | About 12.0 |
| Same kaolin but rubbed for 120 minutes as ammonium acetate-kaolin | About 46.0 |

In order to measure the resistance to dry breakage, the clay was cast in the form of rods having a cross section of 4 mm. x 4 mm. and the rods were dried at 110° C. The resistance to breakage value was then converted to a cross section of 1 cm.$^2$.

*Example 21.—Increase of the adsorption capacity*

As seen in the following Table 3, the adsorption capacity of the kaolin is significantly increased by rubbing of an intercalation compound.

TABLE 3.—CHANGE OF ADSORPTION CAPACITY OF KAOLIN

| Pretreatment of the kaolin: | Grams of kaolin for the quantitative adsorption of 100 mgr. of methyleneblue from 100 ml. of aqueous solution |
|---|---|
| Starting material kaolin from Schnaittenbach OF | About 18.0 |
| Same kaolin but rubbed for 30 minutes as ammonium acetate-kaolin and then washed | About 4.2 |
| Same kaolin but rubbed for 30 minutes as formamide-kaolin and then washed | About 5.4 |
| Same kaolin but rubbed for 30 minutes as hydrazine-kaolin | About 3.8 |

In order to determine the methyleneblue adsorption as indicated in the above Table 3, a solution of 100 mgr. of methyleneblue in 100 ml. of water was admixed in a 100 ml. cylinder with small portions of kaolin such that after 2 minutes of shaking and subsequent settling, the super potent solution was colorless.

*Example 22.—Decrease of the hydrophilic surface characteristics and increase of the organophilic surface characteristics*

By choosing suitable intercalation compounds, the wettability of the kaolin can be changed. For this purpose it is sufficient in many instances merely to produce a suitable intercalation compound. A significantly stronger effect, however, is obtained if the intercalation product is ground in the previously described manner.

(*a*) *Decrease of the wettability by water.*—Ammonium acetate-kaolinite is treated with A1N-ammonium fluoride solution. The mixture thus obtained is filtered after 24 hours and the residue is dried. During the treatment with the ammonium fluoride, the ammonium acetate in the kaolin lattice is replaced by ammonium fluoride and the basal plane spacing reduced from about 14 A. to 9.2 A. If concentrated ammonium fluoride solutions are used, then the layer distance remains constant at higher values (for example, in 2 n-solutions it remains at 10.4 A.). Upon drying, the ammonium evaporates. The hydroxide ions of the kaolinite, however, are thus replaced by the fluoride ions. The layer distance of the fluoro-kaolinite is about 7.4 A. The kaolin thus obtained exhibits much less wettability toward water than untreated kaolin.

The wetting angle or boundary angle upon wetting with water is 0° with the untreated kaolinite and is 70° with fluoro-kaolinite.

In order to measure the wetting angle, plane plates were pressed under a pressure of 1000 g./cm.$^2$ a drop of water was then applied and the wetting angle was measured.

*Example 23.—Example for the increase of the wettability towards organic liquids*

Ammonium acetate kaolinite was admixed with 0.5 percent by weight of trimethylammonium chloride and 1 percent by weight of n-hexyl alcohol. The mixture thus obtained was ground in a mill at high shearing speed. In doing so, the kaolinite crystals become substantially thinner. Due to the high shearing speed, the crystals, however, were also broken up or torn into smaller particles in a direction perpendicular to the plane of the individual lamella or the alcohol molecules which intercalated between the layers and the ammonium ions reacted at the breaking areas and rendered the kaolinites hydrophobic.

Wetting or boundary angle of the wettability.
(a) Untreated toward water 0°.
(b) Treated as described toward water 100°.
(c) Treated as described, toward toluene 0°.
(d) Treated as described, toward acetonitrile 0°.

While specific embodiments of the invention have been shown and described in detail to illustrate the application of the inventive principles, it will be understood that the invention may be embodied otherwise without departing from such principles.

What is claimed is:

1. A process of treating kaolinite containing clay which comprises mixing the clay with at least one chemical compound in liquid form, said compound being selected from the group consisting of
   (a) ammonium acetate;
   (b) hydrazine;
   (c) urea;
   (d) formamide;
   (e) acetamide;
   (f) dimethylsulfoxide and
   (g) ammonia,
said liquid form being at least a concentrated solution of said compound, whereby said chemical compound is introduced between the individual layers of the clay, the weight ratio of the clay to said compound being between about 100 to 4 to 100 to 20, and subjecting the clay to a mechanical treatment which exerts a shearing force in a direction substantially parallel to the clay layers, whereby said layers perform a sliding action relative to each other, an intercalation product between said clay and said chemical compound is obtained in which the distance between the clay layers is enlarged and the lattice structure of the clay is distended.

2. A process of improving the characteristics of kaolinite containing clay, which comprises introducing into the crystal lattice between the individual layers of the clay at least one of the chemical compounds
   (a) ammonium acetate;
   (b) hydrazine;
   (c) urea;
   (d) formamide;
   (e) acetamide;
   (f) dimethylsulfoxide and
   (g) ammonia,
in amounts of at least 4 grams of compound per 100 grams of clay, thereby to form an intercalation product in which the distance between the individual clay layers is greater than in the original clay, said introducing being effected by mixing the clay with the chemical compound in liquid form, said liquid form being at least a concentrated solution of said compound, and subjecting the clay to a mechanical treatment which exerts a shearing force on the clay in a direction substantially parallel to the clay layers.

3. A process as claimed in claim 2, wherein said intercalation product subsequently is mixed with a substance which is capable of at least partially displacing the compound originally introduced into the lattice, said substance being selected from the group consisting of saturated, unsaturated and aromatic amines and quaternary ammonium salts,
   N-substituted acid amines,
   fatty acid amides having between 3 and 22 carbon atoms,
   metal salts of carboxylic acids and aminocarboxylic acids,
   lactames,
   lactones,
   alkali metal halides,
   ammonium halides,
   alkaline earth metal halides,
   alkali metal nitrates,
   alkaline earth metal nitrate,
   the alkali metal and ammonium cyanides and rhodanides,
   aluminum halides and
   the chlorides, bromides, iodides, nitrates and acetates of chromium, iron, cobalt, nickel, manganese and copper.

4. A process as claimed in claim 1, wherein an additional substance is mixed with the intercalation product formed to displace at least a portion of the compound therein, said additional substance being selected from the group consisting of saturated, unsaturated and aromatic amines and quaternary ammonium salts,
   N-substituted acid amines,
   fatty acid amides having between 3 and 22 carbon atoms,
   metal salts of carboxylic acids and aminocarboxylic acids,
   lactames,
   lactones,
   alkali metal halides,
   ammonium halides,
   alkaline earth metal halides,
   alkali metal nitrates,
   alkaline earth metal nitrate,
   the alkali metal and ammonium cyanides and rhodanides,
   aluminum halides and
   the chlorides, bromides, iodides, nitrates and acetates of chromium, iron, cobalt, nickel, manganese and copper.

5. A process as claimed in claim 2, wherein between about 4 to 20 grams of chemical compound per 100 grams of clay are introduced into the lattice.

6. A process as claimed in claim 2, wherein said mechanical treatment is performed during the formation of said intercalation product.

7. A process as claimed in claim 2, wherein said mechanical treatment is performed after said intercalation product has been formed.

8. A process as claimed in claim 3, wherein said additional substance is incapable of directly reacting with clay, but is capable of being incorporated into the clay due to presence of said chemical compound.

9. A process as claimed in claim 2, wherein said chemical compound is subsequently removed from the lattice structure of said clay.

10. A process as claimed in claim 9, wherein said removal is effected by washing said intercalation product with a liquid capable of dissolving said chemical compound.

11. A process as claimed in claim 3, wherein said substance is subsequently removed from said clay.

12. A process as claimed in claim 1, wherein said chemical compound, after having been incorporated into the lattice structure, is subsequently and at least partially removed therefrom.

13. A process as claimed in claim 4, wherein the clay after the incorporation of said additional substance is subjected to a treatment for at least partially removing said additional substance and any remaining portion of said chemical compound.

14. Clay obtained according to the process of claim 2.
15. Clay obtained according to the process of claim 3.
16. Clay obtained according to the process of claim 9.

References Cited by the Examiner
UNITED STATES PATENTS

| | | | |
|---|---|---|---|
| 2,535,647 | 12/1950 | Millman et al. | 106—72 |
| 2,838,410 | 6/1958 | Francis et al. | 106—72 |

HELEN M. McCARTHY, *Acting Primary Examiner.*

T. E. LEVOW, J. POER, *Assistant Examiners.*